United States Patent [19]
Steele et al.

[11] Patent Number: 5,937,933
[45] Date of Patent: Aug. 17, 1999

[54] REGENERATOR HEAT EXCHANGER HAVING ONE OR MORE ADJUSTABLE PERFORMANCE CHARACTERISTICS

[75] Inventors: Donald F. Steele, Cohasset, Mass.; Lawrence C. Hoagland, Center Harbor, N.H.

[73] Assignee: AirXchange, Inc., Rockland, Mass.

[21] Appl. No.: 08/736,382

[22] Filed: Oct. 24, 1996

Related U.S. Application Data

[63] Continuation-in-part of application No. 08/132,523, Oct. 6, 1993.
[51] Int. Cl.$^6$ ........................................ F23L 15/02
[52] U.S. Cl. .................................. 165/10; 165/8
[58] Field of Search ............................. 165/8, 10

[56] References Cited

U.S. PATENT DOCUMENTS

| | | | |
|---|---|---|---|
| 4,200,441 | 4/1980 | Hönmann et al. | 55/181 |
| 4,432,409 | 2/1984 | Steele | 165/8 |
| 4,825,936 | 5/1989 | Hoagland et al. | 165/8 |
| 4,875,520 | 10/1989 | Steele et al. | 165/10 |
| 5,485,877 | 1/1996 | Brophy | 165/8 |
| 5,662,161 | 9/1997 | Huhes et al. | 165/10 |

FOREIGN PATENT DOCUMENTS

| | | | |
|---|---|---|---|
| 1 200 237 | 4/1986 | Canada | 257/8 |

*Primary Examiner*—A. Michael Chambers
*Attorney, Agent, or Firm*—Lappin & Kusmer

[57] ABSTRACT

A rotary heat regenerator wheel in which one or more performance characteristics, such as heat exchange efficiency and air flow rate, can be adjusted during manufacturing, during or after installation and/or after use of the regenerator. The wheel comprises removable segments having differing performance characteristics. One embodiment of the regenerator wheel includes segments containing both latent and sensible heat exchange material. Latent heat transfer efficiencies between those provided by heat regenerators having segments made only of sensible heat exchange material, and by regenerators having segments made only of latent heat exchange material, are achieved by adjusting the ratio of segments with exposed surface area of latent heat exchange material relative to segments having exposed surface area of the sensible heat exchange material. In another embodiment the air flow, pressure drop or surface area density of the wheel can be adjusted by using segments having different surface area densities.

45 Claims, 2 Drawing Sheets

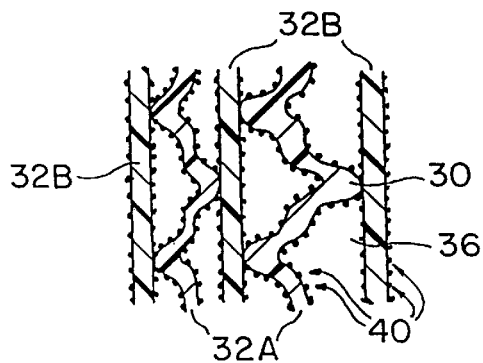
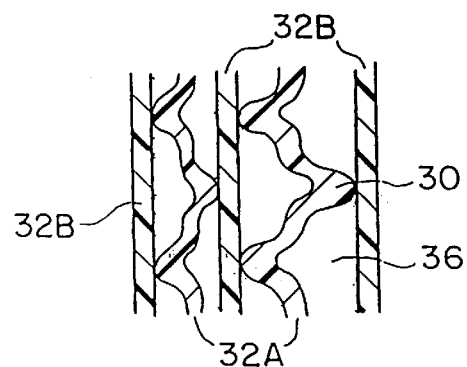
FIG. 3  FIG. 4
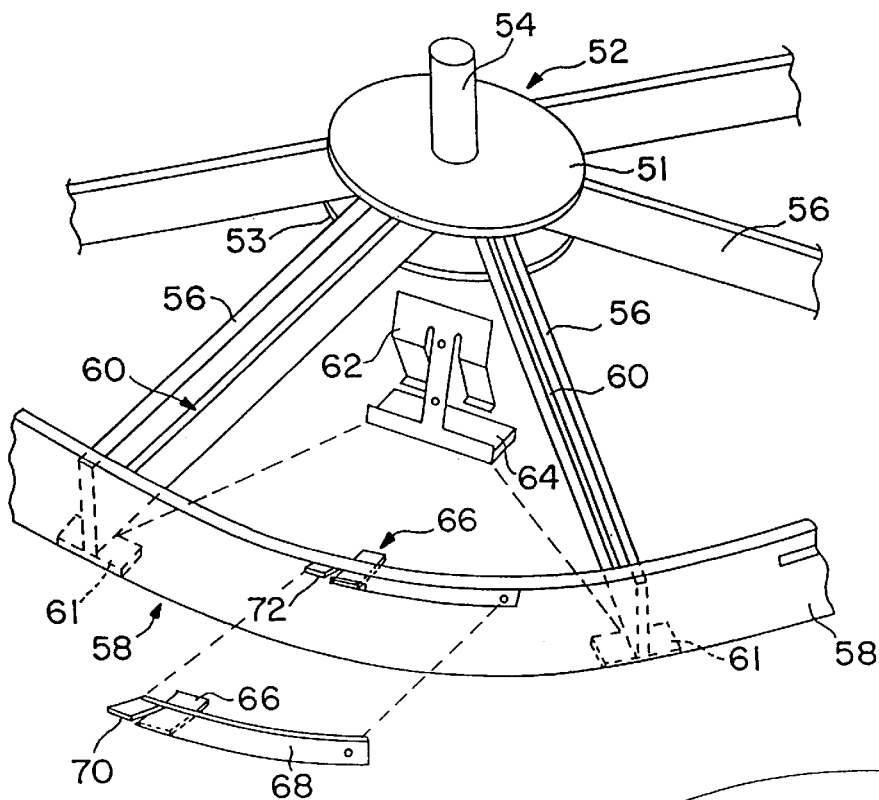
FIG. 5
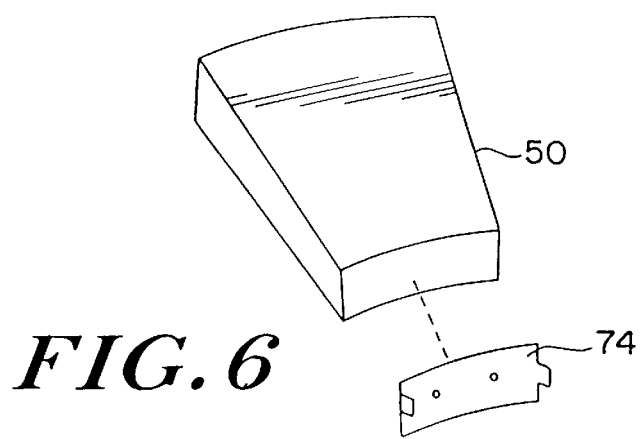
FIG. 6

REGENERATOR HEAT EXCHANGER HAVING ONE OR MORE ADJUSTABLE PERFORMANCE CHARACTERISTICS

CROSS-REFERENCE TO RELATED APPLICATIONS

This application is a continuation-in-part of pending application U.S. Ser. No. 08/132,523, filed Oct. 6, 1993 (Attorney Docket No. AIR-8).

FIELD OF INVENTION

The present invention relates generally to rotary energy exchange devices, and, more particularly, to rotary energy exchange wheels having an energy transfer matrix comprised of a plurality of readily removable, interchangeable segments. The interchangeable segments comprising the energy transfer matrix can be made with different values of at least one performance characteristic so that by assembling the matrix with segments of more than one value, or substituting one or more select segments of one value for segments of a different value, the total performance characteristic of the entire matrix of the energy transfer wheel can be adjusted at any time, whether at the time of or subsequent to its manufacture and before or after installation and use.

BACKGROUND OF THE INVENTION

Regenerator heat exchange devices or regenerators are well known. One type of regenerator is the rotary air-to-air heat exchanger, which is typically in the form of a rotary heat exchange wheel including a matrix of heat exchange material. For example, see Canadian Patent No. 1,200,237 (Hoagland) and U.S. Pat. Nos. 4,432,409 (Steele) and 4,875,520 (Steele et al.), all assigned to the present assignee (and hereinafter the U.S. Patents being referred to as the '409 and '520 Patents, respectively) and incorporated herein by reference. Rotary air-to-air heat exchangers transfer sensible heat and moisture, usually between ducted and counterflowing airstreams, for the purpose of conserving energy within a building, while providing outdoor air ventilation to remove air pollutants from buildings. For example, heat and moisture from indoor air being exhausted to the outdoors during the heating season are transferred to the cooler, dryer incoming fresh air, and during the cooling season, heat and moisture from entering warm moist outdoor air is transferred to the cooler drier air as it is exhausted to the outdoors. Transfer of heat and moisture in this manner can typically reduce the amount of energy required to heat, cool, humidify or dehumidify the incoming ventilation air typically anywhere between about 50% and about 85%, depending primarily on the performance characteristics of the rotary energy transfer wheel.

It is well known to make such rotary heat exchange wheels with a matrix of heat exchange material (capable of absorbing sensible heat) coated with a desiccant material (capable of absorbing moisture and thus latent as well as sensible heat). Such regenerators are used in heating and/or air conditioning systems in which the transfer of both sensible and latent heat is desired in the ventilation portion of such systems, as, for example, in the case of air conditioning systems used in summer climates characterized by hot and humid outdoor air. In such climates, it is often desirable to bring fresh air in from the outdoors. In this case the regenerators are used to transfer sensible and latent heat from incoming air to the outgoing air. The removal of latent heat from incoming air prior to passing the air over evaporation coils of an air conditioning system helps reduce the heat load imposed on the air conditioning system.

To achieve maximum latent heat transfer, as is well known in the prior art, a suitable sensible heat exchange matrix material such as plastic (i.e., high molecular weight, synthetic polymers), aluminum, or Kraft or other fibrous paper is completely and uniformly coated with a desiccant material in accordance with processes known to those skilled in the art. In one type of regenerator, the matrix comprises a plastic strip coated with a desiccant material wound around a hub so as to form a heat exchange wheel. The airflow through the wheel, and the efficiency of heat transfer by the wheel matrix, are determined in part by the spacing between opposing surfaces of adjacent portions of the strips of the matrix. This spacing can be controlled by controlling the height of embossments in the strip. For a given air flow, the tighter the spacing (or the denser the wrap), the higher the efficiency of heat exchange matrix and the greater the pressure drop across the two sides of the wheel. See U.S. Pat. Nos. 4,432,409 to Steele and 4,825,936 to Hoagland et al. Thus, the rated air flow and efficiency through a regenerator wheel of a given diameter are performance characteristics of the regenerator matrix that are in part determined by the wrap density of the strips.

Minimum amounts of outdoor air ventilation for control of indoor air pollution are now frequently specified by ventilation building codes and standards in terms of cubic feet of air per minute/per occupant (CFM per person), but for a particular space this number may typically vary by a factor of up to four based upon the nature of the occupancy and the anticipated occupant density, e.g., schools, office buildings, libraries, restaurants, etc. Typically, ventilation systems are designed and installed in buildings to meet the initial intended occupancy requirements. For reasons of economy, ventilation systems will also generally be manufactured and installed to only provide minimum required ventilation rates to a building. Such systems may include variable speed blowers and adjustable air dampers to allow for changes of ventilation air in the event of a change of occupancy that requires higher ventilation rates. For ventilation systems including porous heat exchange, energy transfer regenerator wheels, the amount of additional ventilation that can be provided in this manner is, however, partly restricted by the pressure drop across the wheel through which supply and exhaust air must flow. With the pressure drop across the energy transfer wheel increasing in direct proportion to the increase of airflow, the maximum pumping capacity of a variable speed blower can be reached before the desired increase of airflow is obtained.

Further, under some circumstances maximum latent heat transfer may not be desirable. For example, under moderate winter conditions it is often desired to use a ventilation system including a sensible heat exchange matrix wheel to remove substantial amounts of moisture from a building. However, when the outdoor air becomes very cold and dry the moisture removal rate provided by a sensible heat exchange matrix wheel may become excessive, and the indoor air humidity may become uncomfortably low. In this case it becomes desirable to have some desiccant coating present on the heat exchange matrix so as to increase moisture retention (and thus allow additional moisture in the air being exhausted from the building to be transferred to the incoming fresh air), but a fully desiccant coated wheel may retain excessive amounts of moisture so that an excessive amount of moisture is returned to the interior of the building with the incoming fresh air.

Such moisture control problems, thus, are not necessarily solved by substituting a latent heat exchange matrix wheel (i.e., wheels heretofore only available with a matrix having a uniform coating of desiccant material) for a sensible heat exchange matrix wheel (i.e., a wheel having a matrix made entirely of sensible heat exchange materials). Whereas a fully desiccant-coated matrix wheel may retain excessive amounts of moisture, a sensible matrix wheel without a desiccant coating material recovers only moisture which condenses on the matrix when the dew point of the airstream is above the temperature of the surface of the matrix. The condensed moisture is reevaporated back into the warmer and drier counterflowing airstream passing through the matrix. This small amount of moisture recovery by a sensible heat exchange matrix may be insufficient to maintain the desired indoor humidity.

The latent heat exchange efficiency desired of a heat exchange matrix also may vary according to changes in the usage of the building it services. For example, the moisture removal rates desired in a retail space may differ from that desired in the same space later converted to a restaurant. Furthermore, in some situations, the desired latent heat exchange efficiency may not be fully determinable until the regenerator is tested at the building itself. Under such circumstances, it is possible that neither regenerators made entirely of heat exchange materials uniformly coated with desiccant material, nor regenerators made entirely of sensible heat exchange materials (not coated with desiccant material) provides the desired latent heat exchange efficiencies since regenerators of both types are usually offered in only a limited number of values of efficiency.

Moreover, after the system is installed the volumetric air flow requirements may change, because of a change of use or occupancy. More specifically, ventilation systems are usually designed to provide a predetermined volumetric air flow so as to meet specific building code and use requirements. If the system including the blower and heat regenerator wheel are originally designed for one range of air flows, and the changes require a different range of air flows, adjustments must be made. Typically, due to the costs of installing ventilation systems in large buildings, such changes in the ventilation system after they are installed are not readily accomplished. For example, the volumetric rate of air flow can be adjusted by only a small amount by changing the pulley systems of the blower. One could also change the entire regenerator matrix wheel with one of a different wrap density. Thus, following installation of a ventilation system, it may be necessary to adjust the flow rate and/or other performance characteristics of the regenerator matrix wheels in response to changes in building design or usage.

Thus, it would be advantageous to be able to customize or adjust in an economical way the airflow rates, customize or adjust the latent and sensible heat transfer characteristics of the regenerator wheel, or customize or adjust some other performance characteristic during or after its manufacture or at the installed site.

OBJECTS OF THE INVENTION

An object of the invention is to provide a rotary heat regenerator with one or more performance characteristics that are adjustable.

Another object of the invention is to provide a rotary heat regenerator wheel having performance characteristics, including latent and sensible heat transfer efficiencies, air flow rate, and pressure drop, which can be readily adjusted after manufacture or installation to meet changing ventilation requirements.

SUMMARY OF THE INVENTION

The above and other objects of the invention are achieved, at least in part, by providing a rotary heat regenerator having a heat exchange matrix with one or more performance characteristics which can be customized or adjusted during or after manufacture, or in the field. Preferably, the matrix of the regenerator wheel includes a plurality of interchangeable, removable sections or segments so that any or all of the segments can be replaced at any time with other like sized segments which differ with respect to at least one performance characteristic. The performance characteristic can be (a) latent and sensible heat transfer efficiencies, or (b) air flow rate and pressure drop. Air flow rate and pressure drop are related to the surface area density (defined below) of the matrix used in the regenerator. Thus, in one embodiment, the performance characteristic is determined by the latent heat transfer characteristic, while in another embodiment the performance characteristic is determined by the surface area density.

In the first embodiment, at least one of the segments is made of a heat exchange matrix material coated with a desiccant material, while at least one other segment is not coated and is primarily used to transfer sensible heat. Thus, through the incorporation of both desiccant-coated and uncoated heat exchange segments into an energy transfer wheel in adjustable proportions, the customized rotary heat regenerator matrix is able to transfer latent heat with an efficiency between that of purely sensible heat exchange matrices and matrices made entirely of heat exchange materials uniformly coated with a desiccant. In accordance with this aspect of the invention, through division of the matrix into removable segments together providing a combination of desiccant-coated and uncoated heat exchange material, the present rotary heat regenerator is further able to transfer latent heat with an efficiency which can be adjusted at any time, whether during or following the manufacturing stage, or on-site during installation, or after operating experience or building usage changes necessitate changes in these performance characteristics.

With respect to the second embodiment, the performance characteristic herein referred to as the "surface area density" (the ratio of (1) the surface area to which the air is exposed as the air passes through the heat exchange matrix to (2) the cubic volume of air space within the matrix between the various heat exchange surfaces, or surface($ft^2$)/volume($ft^3$)) of the regenerator wheel is customizable or adjustable in order to adjust the ratio of volumetric airflow rate to pressure drop. Such changes in surface area density affect the energy transfer efficiency so a tradeoff is made between efficiency and air flow capacity for a given wheel diameter. This ratio can be adjusted by varying (a) the spacing between adjacent layers of heat exchange surfaces within the material, or (b) the surface area to which the volume of air passes. More specifically, decreasing the spacing through which a fixed volume of air passes, or increasing the surface area to which the fixed volume of air is exposed will increase this ratio, and vice versa. For example, the wheel comprises a matrix comprising a plurality of segments each including a stack or multiple layers of strips of heat exchange material (coated or uncoated). Some of the strips can be provided with embossments on one or both sides which keep adjacent strips spaced from one another and thus provide spaces for airflow through the matrix. The height of the embossments can be selected to provide greater or lesser spacing between adjacent strips in the matrix, thereby establishing a desired surface area density of the matrix. In accordance with this embodiment of the invention, the heat exchange matrix can be customized by using a plurality of segments in which at least two segments are of different surface area densities, regardless of whether they are coated with a desiccant material or not. For example, the desired surface area density of the entire matrix already made of a plurality of segments having the same surface area density can be modified by substituting at least one segment having a higher or lower surface density with a corresponding segment in the matrix.

Still other objects and advantages of the present invention will become readily apparent to those skilled in this art from the following detailed description wherein a preferred embodiment is shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not restrictive.

BRIEF DESCRIPTION OF THE DRAWINGS

For a fuller understanding of the nature and objects of the present invention, reference should be had to the following drawings, wherein:

FIG. 3 is a cross-sectional view taken of a portion of the matrix along line A—A shown in FIG. 2, and comprising both strips of desiccant-coated material;

FIG. 4 is a cross-sectional view taken of a portion of the matrix along line A—A shown in FIG. 2, and comprising an alternative to that shown in FIG. 3 (i.e., both strips of uncoated sensible material);

FIG. 5 is a perspective view of a part of the wheel of FIG. 1 with sections removed; and FIG. 6 is a perspective view of one of the sections used in the FIG. 1 embodiment.

DETAILED DESCRIPTION OF THE DRAWINGS

In accordance with the present invention, a rotary heat regenerator, preferably in the form of a rotary air-to-air heat exchange wheel, comprises a heat exchange matrix formed from a plurality of interchangeable, removable segments. The matrix can be assembled so that at least two of the segments are different from one another with respect to a predetermined performance characteristic, such as latent heat exchange transfer characteristic or air flow rate, so that the performance characteristic of the matrix can be established during manufacture, or adjusted after manufacture and installation and/or use in the field by substituting different segments in predetermined numbers and arrangement.

The invention is based in part upon the realization that it may be desirable to (1) adjust the ventilation rate of a ventilation system utilizing a porous regenerator heat exchange matrix, beyond the limits imposed by the pressure drop across the regenerator device, or (2) modify the latent heat transfer efficiency between those provided by regenerator devices comprising a matrix solely made of a sensible heat exchange material and regenerator devices comprising a matrix solely made of a heat exchange material uniformly coated with a desiccant, without developing new coating methods, by utilizing both types of materials in the same regenerator in a proportion directly related to the desired latent heat transfer efficiency.

Figure 1:
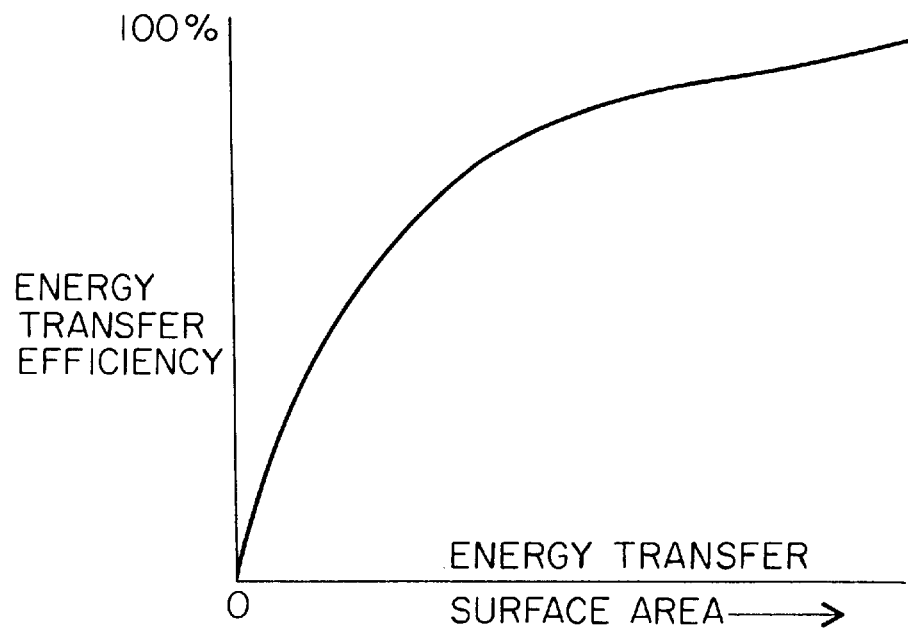
FIG. 1 is a graph of the relationship between heat transfer efficiency and the surface available for heat transfer.

The desiccant-coated, latent heat exchange matrix materials provide surface area for moisture transfer. As stated above, moisture that can be recovered by sensible heat is exchange material (without a desiccant coating material) matrix is that which condenses on the material when the dew point of the airstream is above the temperature of the surface of the material. For purposes herein such a matrix material is referred to herein as a "sensible heat exchange material" and is used primarily to transfer sensible heat. A "latent heat exchange material", however, includes a desiccant that is used for transferring at least latent heat (associated with moisture) and is capable of also transferring sensible heat. Thus, the latter term includes enthalpy exchangers. Moisture transfer efficiency, like sensible heat transfer efficiency, varies as a function of the available transfer surface area. The relationship, as shown graphically in FIG. 1, is not linear, but exponential. At low efficiencies, i.e., near zero percent, doubling the surface transfer area will essentially double the efficiency; at higher efficiencies, i.e., near 100%, doubling the surface transfer area will result in very small efficiency increases, i.e., approximately 1% or 2%. At around 80% to 85% efficiency, a common operating point for regenerator matrices made of plastic heat exchange materials, doubling the surface transfer area will result in an efficiency increase of around 8% to 10%, e.g., from approximately 70% to 80% or from approximately 80% to 88%. Accordingly, we have found that a regenerator matrix made of 50% plastic sensible heat exchange material and 50% latent desiccant-coated plastic heat exchange material will have approximately the same sensible heat transfer efficiency of the regenerator matrix made of 100% sensible heat exchange material, but only approximately 70%–80% of the moisture transfer efficiency of the regenerator matrix made of 100% desiccant-coated heat exchange material (depending on the position along the curve of FIG. 1). A regenerator matrix with these efficiencies will provide suitable sensible heat recovery, and often a much more suitable moisture recovery, compared to regenerator matrices made of entirely latent, desiccant-coated material or of entirely sensible heat exchange material. Furthermore, in accordance with the present invention, regenerator matrices can be modified or changed after manufacture, and even at an installation site to provide various other sensible heat and moisture transfer efficiency combinations for other climatic conditions and different building uses by substituting matrix segments made of different amounts of latent and sensible heat exchange materials.

In one preferred embodiment, generally shown in FIG. 2, and described in greater detail hereinafter in connection with FIGS. 4–6, the plastic matrix comprises a plurality of separate wedge-shaped matrix elements or segments each formed, for example, by cutting completely through one or more strips which are wound into a wheel and subsequently cut, for example, with a heated tool from one face to the opposite face so that the resulting wedge-shaped elements each have arc-shaped strips fused at their ends along the cut line. Matrix segments can be formed from strips of plastic (e.g., high molecular weight, synthetic polymers), aluminum, Kraft or other fibrous paper, or steel. Plastic of a type capable of being heat sealed is preferably used. Those skilled in the art will recognize that other matrix construction techniques may be employed, and matrices of other configurations, such as those containing flat layers, or a honeycomb structure, may be produced. As described in greater detail hereinafter in connection with FIGS. 3 and 4 and in the '237, '409, and '520 Patents, suitable spacing means are provided in the matrix so as to form gas passageways in an axial direction through the wheel segments at a given surface area density.

Figure 2:
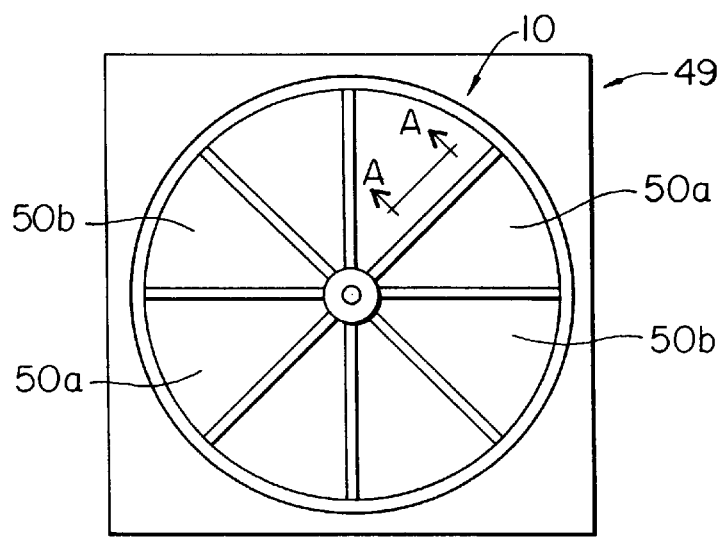
FIG. 2 is a front view of a preferred embodiment of a rotary heat exchange wheel, positioned within a rotary heat exchange system, the wheel comprising a matrix made with removable segments in accordance with the present invention.

In the matrix of FIG. 2, the heat exchange material 16 of each segment consists of strips made either of a sensible heat exchange material or a latent heat exchange material spirally wound together before being cut into the individual segments and subsequently attached to the hub 12. The strips of latent heat exchange material are coated with a desiccant as illustrated more fully in FIG. 3, whereas the strips of sensible heat exchange material are not as illustrated more fully in FIG. 4.

Referring to FIGS. 3 and 4, two examples of arrangements for the plastic strips of two different segments are illustrated in FIGS. 3 and 4, wherein the matrix of one segment is formed with two alternating types of strips made of a plastic sensible heat exchange material coated with a desiccant material, and one segment formed with two alternating types of strips made of an uncoated plastic sensible heat exchange material. In both arrangements, the means for forming spaces between adjacent strips includes regularly distributed protrusions or embossments 30 formed on one of the two strips used to form the matrix of the segment, while the other strip is flat. The embossments 30 extend in both directions from the surfaces of embossed strip 32a so as to separate the embossed strip 32a from the adjacent surfaces of the flat strip 32b and thus form air channels 36 for the flow of air axially through the matrix 10. The height of the embossments determines the extent of separation between adjacent strips and thus determines the flow passage hydraulic diameter, the surface area density, and thus the air flow versus pressure drop relationship, for the matrix.

In FIG. 3, the embossed strip 32a and flat strip 32b are coated, preferably on both surfaces, with desiccant material 40 (shown in greatly enlarged detail) so as to provide two strips of latent heat exchange material. A dry desiccant, such as silica gel, is preferably used. A preferable method of uniformly coating plastic strips with dry desiccant is described in the '520 Patent. In FIG. 4, the matrix is identical to that shown in FIG. 3, except that the embossed strip 32a and flat strip 32b are both made of an uncoated sensible heat exchange material. If desired, the matrix can include strips of both latent heat exchange material (i.e., desiccant-coated) and sensible heat exchange material (i.e., uncoated).

In addition, the surface area density of a segment is in part determined by the height of the embossments 30, so that segments of different surface area densities can be provided by making the segments with embossed strips 32a having embossments of differing heights. Clearly, increasing the height of the embossments reduces the surface area density of a segment, and vice versa.

Thus, as described with reference to FIGS. 3 and 4, each matrix segment can be formed with all the surface area providing latent heat transfer; sensible heat transfer only, or a combination of both. Segments of varying surface area densities easily can be provided by providing the embossed strips 32a of the segments with embossments of one being of a different height from those of another, or all segments can have the same surface area density but vary with respect to some other performance characteristic. The latent heat transfer efficiency of the matrix is determined by a curve similar to that shown in FIG. 1. When both coated and uncoated surfaces are used in the same segment, the ratio of the two can be adjusted, in one embodiment, by adjusting the amount of surface area that is provided by latent heat transfer material relative to the surface area that is provided by the sensible heat transfer material only. For example, when making a particular segment by using three strips coated with the desiccant and one strip of uncoated sensible heat exchange material the ratio of approximately 3 to 1 of relative surface area is achieved with a corresponding latent heat transfer efficiency as determined by the curve of the type shown in FIG. 1. With this arrangement, wheels of different ratios of coated and uncoated surface areas can be provided so that a particular wheel segment can be selected at the site where the rotary heat exchange regenerator is installed so as to select a desired latent heat transfer efficiency.

As shown in FIGS. 2, 5 and 6, the embodiment shown is particularly adapted for commercial use, in which wheels tend to be of larger dimensions, although the principles can be applied to smaller, residential wheels. In the embodiment shown the matrix 10 is divided into a plurality of removable wedge-shaped elements 50 of heat exchange material. A selected number of elements 50a are made of a latent heat exchange material; the remaining elements 50b are made of a sensible heat exchange material. The proportion of elements which are desiccant-coated and elements which are nondesiccant-coated can be varied according to the latent heat transfer efficiency desired. In addition, segments of different surface area densities can be used to form the matrix of a wheel. In this instance where eight elements are used, each circumscribing 45° of the wheel, nine different latent heat exchange efficiencies and almost an infinite number of different pressure drops can be provided at the site where the wheel is used, by using anywhere from zero to eight elements made of latent heat exchange material, and segments of different surface area densities. If desired each segment can comprise some layers of sensible heat exchange material, and some layers of latent heat exchange material, so that the possible combinations of the percentage of sensible heat exchange material and the percentage of latent heat exchange material used to comprise the matrix are almost limitless.

Referring more specifically to FIGS. 5 and 6, the wedge-shaped elements 50 of heat exchange material are preferably made from wheels of spirally wound plastic strips as described previously or by any other suitable method. For each type of element 50a, 50b, wheels wound from two or more strips with suitable spacing means, such as embossments 30, are preferably used so as to form layers with channels for the flow of air. The number of segments having different surface area densities is a matter of choice.

The sections can be supported in any suitable manner, and are preferably supported so that each section may be individually removed and replaced with other segments. For example, they can in a suitable frame so that each can be easily mounted and replaced at the site where the wheel is used. A frame, for example, is shown in FIGS. 5 and 6, and comprises wedge-shaped openings for supporting the respective wedge-shaped elements 50. The wheel includes a matrix hub 52 comprising two circular disks 51 and 53, the hub being provided with a shaft 54 so that the wheel can be rotatably mounted within a rotary exchange device. The wheel also includes a plurality of spokes 56 extending radially from and supported at one end by the hub, and supported at the other end by an outer band 58. Means, such as plastic foam strips 60, are provided on each side of each spoke for providing an airtight seal between each element 50 and each spoke 56. Means are also provided for removably securing each of the elements 50 in the frame. The latter means, for example, includes a retaining tab 61 provided on one side of the wheel at the place where the spoke connects to the outer band 58 so as to provide a retaining element for each element 50 when it is positioned in the wedge-shaped opening. A spring clip 62 is attached to the outer end of each spoke. Spring clip 62 is adapted to be compressed by the wedge-shaped element 50 when the latter is inserted in the respective opening so as to secure the wedge-shaped element in place. The spring clip includes a rectangular stop 64. Once in place each wedge is locked in place by a retainer tab 66, which is attached to one end of a spring retainer strap 68, the other end of the strap being attached to the outer surface of the outer band 58 so that the tab 66 extends through a slot 72 in the outer band into contact with the wedge. A grip 70 is provided on the strap for allowing the user to pull back on the strap so that the tab will pull out of contact with the segment 50 and from the slot 72, making it possible to pull the segment 50 out of the wedge-shaped opening.

As shown in FIG. 6, each of the wedge shaped elements 50 is provided, for example, with a segment hub retainer attachment 74, adapted to engage hub 52 between the disks 51 and 53 so as to prevent any damage to the element 50 when inserting or removing the element. The spring clips 62 urge the wedge-shaped elements 50 toward the hub 52 so as to be sandwiched between the hub's axially opposing disks 51 and 53.

Thus, to allow removal or insertion of one of the wedge-shaped elements 50, the associated grip 70 of the spring retainer strap is pulled until the retainer tab 66 is drawn back through the slot 72 of the outer band 58 away from the hub 52. When the grip 70 is released, the tab 66 snaps radially inward through the slot 72 so as to prevent the wedge shaped element 50 from moving.

The use of removable wedge-shaped elements has a further advantage for commercial rotary heat regenerators, which are generally larger in size than residential rotary heat regenerators. When the matrix segments must be removed (for substitution, testing, replacement, cleaning, etc.), the less bulky elements are easier to handle than a whole, undivided matrix. It should also be appreciated by those skilled in the art that a divided matrix of multiple removable segments can be used for lower airflow residential applications within the scope of the present invention.

A standard wrap density of matrix material in currently available regenerator wheels is about 50 wraps per inch. By reducing the wrap density of the matrix wheel to about 30 wraps per inch, the air flow through the wheel can be increased substantially, for a given pressure drop across the wheel, with a relatively small loss in system efficiency. On the other hand, an increase in the wrap density, with a consequential reduction in air flow for a given pressure drop across the wheel, can be achieved by winding the matrix strip materials more tightly. As examples, a regenerator ventilation system nominally specified to deliver between 1000 and 1500 cubic feet per minute (CFM) of air can be modified according to the invention with interchangeable matrix wheel sections to deliver up to approximately 2300 CFM of air, an increase in performance of about 50%. Similarly, a system designed to deliver up to 3000 CFM of air can be modified according to the invention to deliver up to approximately 4500 CFM of air. This substantial increase in performance is obtained with only about a 10% loss in efficiency.

Thus, a rotary heat regenerator has been described with a regenerator matrix comprising a plurality of individual segments of different performance characteristics, the segments being easily exchangeable so as to adjust the performance characteristics to meet the requirements at the site. It is clearly easier to tailor a ventilation system to specific requirements by adjusting relatively small components, such as by changing heat transfer segments, than by adjusting large components, such as by changing the entire wheel.

Thus, by utilizing certain segments made from a matrix of sensible heat exchange material, and other segments made from a matrix of latent heat exchange material, the present rotary heat regenerator is able to transfer latent heat with efficiencies between those of regenerators comprising matrices made of only sensible heat exchange material, and those regenerators made with only latent heat exchange materials. Through division of the matrix into removable elements together containing a selected combination of latent heat exchange material and sensible heat exchange material, the present rotary heat regenerator is further able to transfer latent heat with efficiencies which can be adjusted at the site of installation.

Furthermore, by providing segments of different surface area densities at the location of installation, the airflow versus efficiency and pressure drop performance characteristics of the regenerator can be adjusted and tailored to meet the requirements of the particular application. For example, if greater airflow is required through the wheel and reduced efficiency is acceptable, a wheel composed of matrix segments having a lower surface area density (greater spacing between adjacent strips in the matrix) can be selected. On the other hand, if greater efficiency is required and either reduced airflow or a greater pressure drop across the wheel is acceptable, then a wheel (or one or more matrix sections) having greater surface area density (closer spacing between adjacent strips in the matrix) can be selected at the site of installation. It should be appreciated that segments of different surface area densities can be combined in one regenerator to provide an average air flow rate through, or pressure drop across, the wheel.

In this disclosure, there are shown and described various preferred embodiments of the invention, but as aforementioned, it is to be understood that the invention is capable of use in various other conditions and environments and is capable of changes or modifications within the scope of the inventive concept as expressed herein.

What is claimed is:

1. A method of constructing a matrix wheel for use in an air transfer system and having at least one performance characteristic whose value is field adjustable as a function of the conditions at the location of installation, the method comprising:

selecting a desired value for the performance characteristic as a function of the conditions at the location of installation;

selecting individual segments from selectively interchangeable segments so that when the selected segments are combined as a wheel and the wheel is used, the wheel provides approximately said desired value of the field adjustable performance characteristic; and arranging the selected ones of said individual segments so as to form the matrix of said wheel having the approximated desired value of the field adjustable performance characteristic.

2. A method according to claim 1, wherein the field adjustable characteristic is air flow as a function of the pressure drop across said wheel.

3. A method according to claim 1, wherein the field adjustable characteristic is the ratio of latent heat exchange efficiency to sensible heat exchange efficiency.

4. A method according to claim 1, wherein the field adjustable characteristic is the surface area density of the wheel, wherein the step of selecting individual wheel segments includes the steps of selecting from segments of differing surface area densities.

5. A method according to claim 1, wherein the adjustable field characteristic is the ratio of latent heat exchange efficieny to sensible heat exchange efficiency, wherein the step of selecting individual segments includes the step of selecting from segments of differing ratios.

6. A regenerator heat exchange device having an energy transfer matrix comprising a plurality of segments, each of said segments being formed of at least one heat exchange material, wherein each of said segments has a specific value of a performance characteristic which is predetermined, and wherein each of said segments is separately removable and interchangeable with any other corresponding segment such that at least two of the segments of said matrix have different values of the performance characteristic resulting in the value of the performance characteristic of the matrix being (a) non-uniform throughout the matrix and (b) adjustable following manufacture of the device by selectively interchanging at least one of the segments of one value of the performance characteristic with a corresponding segment of at least one other value of the performance characteristic.

7. A device according to claim 1, wherein the performance characteristic is the latent heat exchange efficiency.

8. A device according to claim 6, wherein one of said at least two segments includes a heat exchange surface made of latent heat exchange material, and the other of said at least two segments includes a heat exchange surface made of a sensible heat exchange material so that the ratio of the total surface area of latent heat exchange material and sensible heat exchange material of the matrix is adjustable by adjusting the ratio of the number of segments of said one segment to the number of segments of the other segment within said matrix so as to adjust the latent heat exchange efficiency of said matrix at the time of manufacture or installation or use.

9. A device according to claim 8, wherein said sensible heat exchange material is selected from the group consisting of a plastic, paper or aluminum material, and said latent heat exchange material is selected from the group consisting of a plastic, paper or aluminum material coated with a desiccant material.

10. A device according to claim 6, wherein the performance characteristic is the surface area density of the matrix.

11. A device according to claim 10, wherein each of said segments comprises a plurality of strips, and means for spacing each of the strips relative to one another so as to allow air to pass through said strips.

12. A device according to claim 11, wherein the means for spacing each of the strips relative to one another includes a plurality of alternating flat and distributed embossed strips.

13. A device according to claim 12, wherein each of said distributed embossed strips includes a plurality of distributed embossments, the height of the distributed embossments determining the spacing between adjacent flat strips, and wherein the height of the distributed embossments of the two segments are different so as to provide different surface area densities.

14. A device according to claim 10, wherein one of said at least two segments includes a latent heat exchange material and the other of said two segments includes a sensible heat exchange material.

15. A device according to claim 14, wherein each of said removable segments comprises a plurality of strips spaced from one another.

16. A device according to claim 15, further including means for spacing said strips from one another.

17. A device according to claim 16, wherein the means for spacing the strips from one another includes embossments formed in at least one surface of alternate ones of said strips.

18. A device according to claim 17, wherein said sensible heat exchange material comprises plastic and said latent heat exchange material comprises plastic coated with a desiccant material.

19. A device according to claim 6, wherein said matrix contained within a wheel and said removable segments are wedge-shaped.

20. In a ventilation system including a heat exchange device, the heat exchange device including a matrix comprising a plurality of segments, each of said segments being formed of at least one heat exchange material, wherein each of said segments has a predetermined value of a performance characteristic, and said segments are separately removable and interchangeable such that at least two of the segments of the matrix have different values of the performance characteristic resulting in the value of the performance characteristic being (a) non-uniform throughout the matrix and (b) adjustable following manufacture of the device by selectively interchanging at least one of the segments of one value of the performance characteristic with a corresponding segment of at least one other value of the performance characteristic.

21. A system according to claim 20, wherein the performance characteristic is the latent heat exchange efficiency.

22. A system according to claim 20, wherein one of said at least two segments includes a heat exchange surface made of latent heat exchange material, and the other of said at least two segments includes a heat exchange surface made of a sensible heat exchange material so that the ratio of the surface area of latent heat exchange material and sensible heat exchange material of the total matrix is adjustable by adjusting the ratio of the number of segments of said one interchangeable segment to the number of segments of the other interchangeable segment within said matrix so as to adjust the latent heat exchange efficiency of said matrix at the time of manufacture or installation or after use.

23. A system according to claim 22, wherein said sensible heat exchange material is selected from the group consisting of a plastic, paper or aluminum material, and said latent heat exchange material is selected from a plastic, paper or aluminum material coated with a desiccant material.

24. A system according to claim 20, wherein the performance characteristic is the surface area density of the matrix.

25. A system according to claim 24, wherein each of said segments comprises a plurality of strips, and means for spacing each of the strips relative to one another so as to allow air to pass through said strips.

26. A system according to claim 25, wherein the means for spacing each of the strips relative to one another includes a plurality of alternating flat and distributed embossed strips.

27. A system according to claim 26, wherein each of said distributed embossed strips includes a plurality of distributed embossments, the height of the distributed embossments determining the spacing between adjacent flat strips, and wherein the height of the distributed embossments of at least one of the one segments is different from the height of the distributed embossments of at least one other of the segments so as to provide different surface area densities.

28. A system according to claim 24, wherein one of said at least two segments includes a latent heat exchange material and the other of said two segments includes a sensible heat exchange material.

29. A system according to claim 28, wherein each of said removable segments comprises a plurality of strips spaced from one another.

30. A system according to claim 29, further including means for spacing said strips from one another.

31. A system according to claim 30, wherein the means for spacing the strips from one another includes embossments formed in at least one surface of alternate ones of said strips.

32. A system according to claim 31, wherein said sensible heat exchange material includes a material selected from the group consisting of a plastic, paper or aluminum material, and said latent heat exchange material includes a material selected from the group consisting of plastic, paper or aluminum material coated with a desiccant material.

33. A system according to claim 20, wherein said matrix segment are contained within a wheel and said removable segments are wedge-shaped.

34. A regenerator heat exchange system comprising a wheel comprising a matrix including a plurality of removable individual heat exchange segments at least two of which differ in construction so as to exhibit different values of at least one performance characteristic, wherein the segments of said matrix are easily arranged so that a desired value of the performance characteristic of said wheel can be approximated at the location of manufacture or installation by substituting one segment of one construction with a corresponding segment of a different construction.

35. A regenerator heat exchange system according to claim 34, wherein said performance characteristics include one or more of the following: latent heat exchange efficiency, sensible heat exchange efficiency, overall system efficiency, volumetric airflow rate and pressure drop.

36. A regenerator heat exchange system according to claim 34, wherein at least one of said segments includes latent heat exchange material and at least one includes sensible heat exchange material, each material providing a determinable surface area exposed to air flowing through the matrix, wherein the relative proportion of each material within the matrix is adjustable at the location of installation by adjusting the number of said first and second segments used for said matrix.

37. A regenerator heat exchange system according to claim 36, wherein said each segment of said matrix includes a plurality of strips stacked so as to form a matrix segment.

38. A regenerator heat exchange system according to claim 37, further including means for spacing each of the strips relative to one another so as to allow air to pass through said strips.

39. A regenerator heat exchange system according to claim 38, wherein at least some of said strips includes a latent heat exchange material.

40. A regenerator heat exchange system according to claim 38, wherein at least some of said strips includes a sensible heat exchange material.

41. A regenerator heat exchange system according to claim 38, wherein the means for spacing each of the strips relative to one another includes a plurality of distributed embossments in at least every other strip.

42. A regenerator heat exchange system according to claim 41, wherein the dimensions of said embossments are preselected to provide a desired spacing between adjacent strips, thereby establishing a desired surface area density of each of said strips within said matrix, and wherein the dimensions of said embossments of at least two of the segments are different.

43. A regenerator heat exchange system according to claim 36, wherein said sensible heat exchange material is selected from the group consisting of a plastic, paper or aluminum material and said latent heat exchange material is selected from a group consisting of a plastic, paper or aluminum material coated with a desiccant material.

44. A regenerator heat exchange system according to claim 34, wherein said selectively removable segments are designed to provide two or more surface area densities.

45. A regenerator heat exchange system according to claim 44, wherein at least one of said removable elements includes a latent heat exchange material and at least one other of said removable elements includes a sensible heat exchange material.

* * * * *